(12) United States Patent
Eslick

(10) Patent No.: US 6,450,465 B1
(45) Date of Patent: Sep. 17, 2002

(54) MULTI-JAW CLAMP

(75) Inventor: William Robert Eslick, Canago Park, CA (US)

(73) Assignee: Panavision, Inc., Woodland Hills, CA (US)

( * ) Notice: Subject to any disclaimer, the term of this patent is extended or adjusted under 35 U.S.C. 154(b) by 0 days.

(21) Appl. No.: 09/802,836

(22) Filed: Mar. 8, 2001

(51) Int. Cl.$^7$ ............................................. A47B 96/06
(52) U.S. Cl. .................... 248/230.4; 74/527; 285/12
(58) Field of Search ............... 248/230.4, 74.1, 248/74.2, 229.13, 229.23, 228.4, 231.51, 316.5; 403/314, 344, 374.3, DIG. 9; 285/409, 410, 12

(56) References Cited

U.S. PATENT DOCUMENTS 2,621,384 A * 12/1952 Shaughter ...................... 24/81

* cited by examiner

Primary Examiner—Ramon O. Ramirez
Assistant Examiner—Kofi Schulterbrandt
(74) Attorney, Agent, or Firm—Lyon & Lyon LLP

(57) ABSTRACT

A multi-jaw clamp capable of attaching to various sized cylindrical objects such as iris rods of a professional movie camera. The multi-jaw clamp includes two housings that each hold a cylinder with at least two circular sections in the sides of the cylinders that are rotatable to change the size of the circular opening for the circular object to which the clamp can attach. The two housings contain hinge means for opening and closing the clamp and at each free end of the housings is a means for closing the clamp and locking the clamp in position around the cylindrical object.

27 Claims, 3 Drawing Sheets

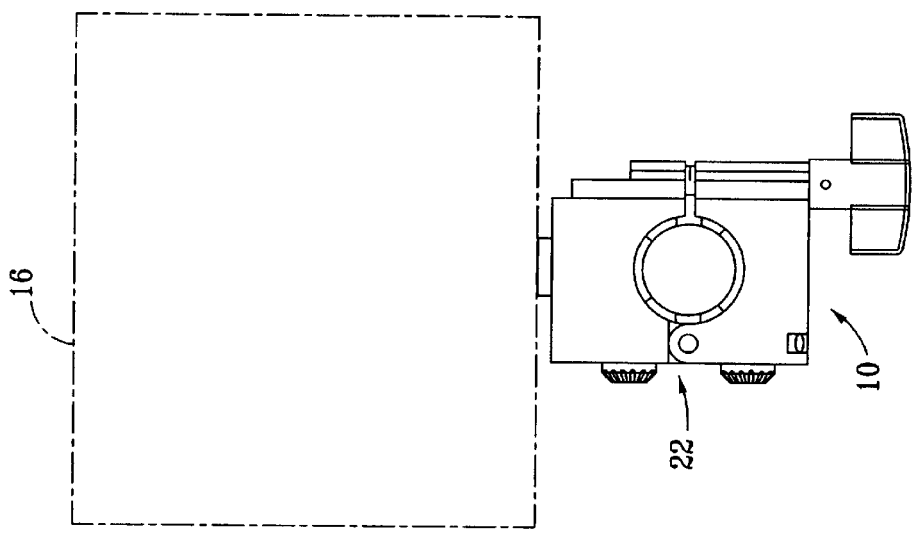
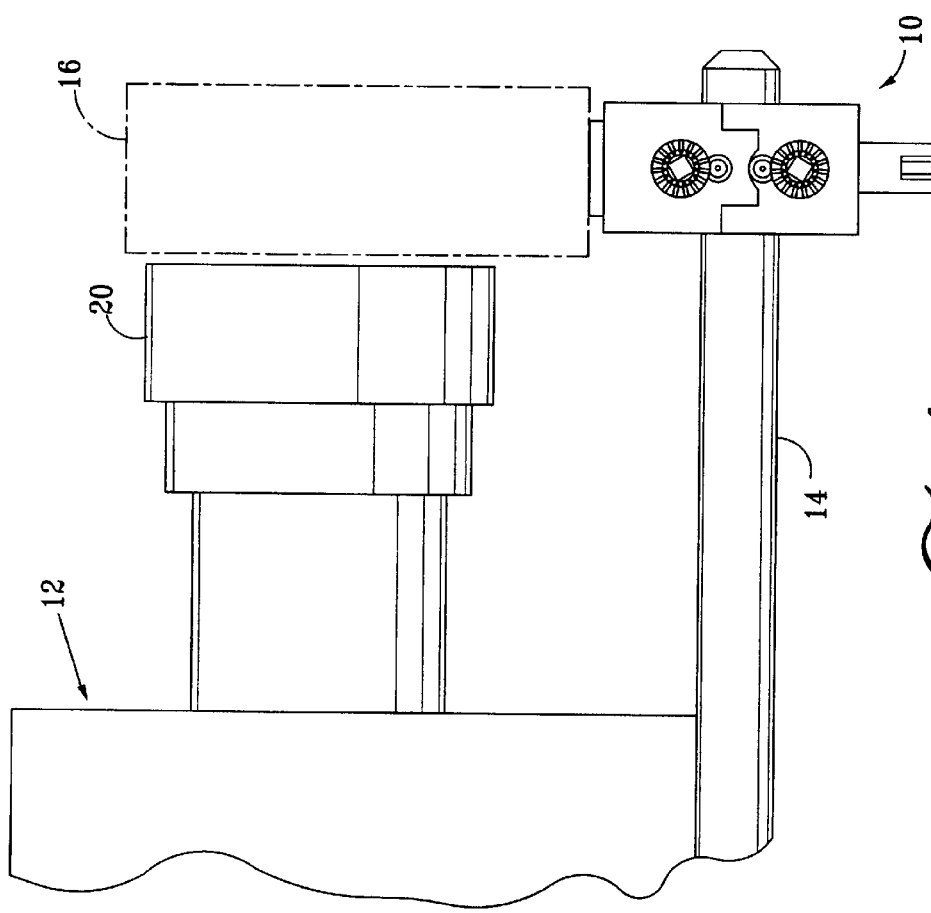

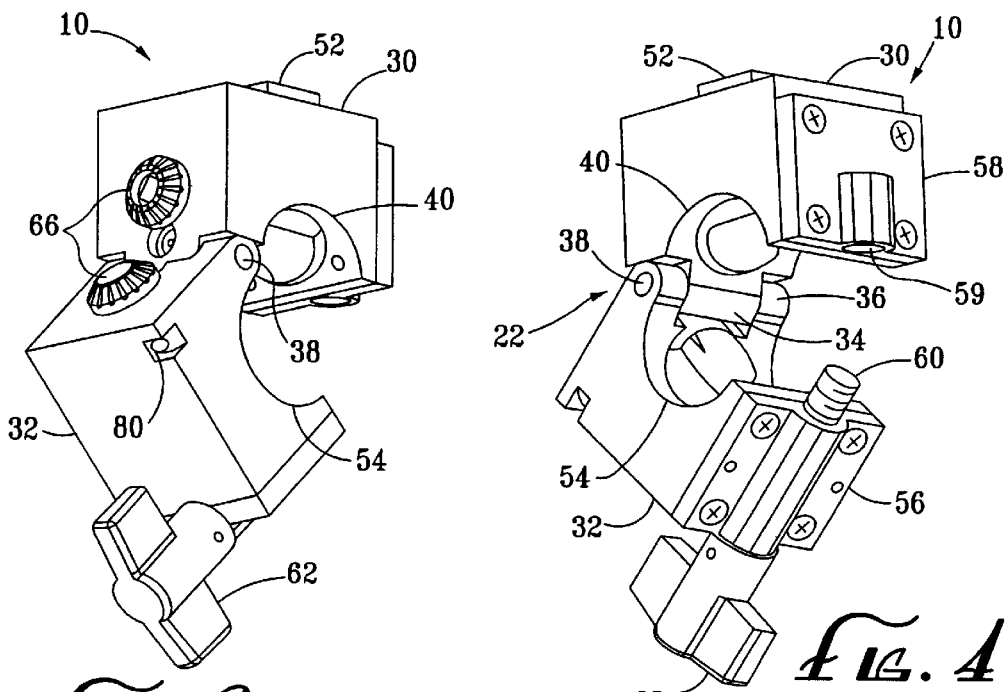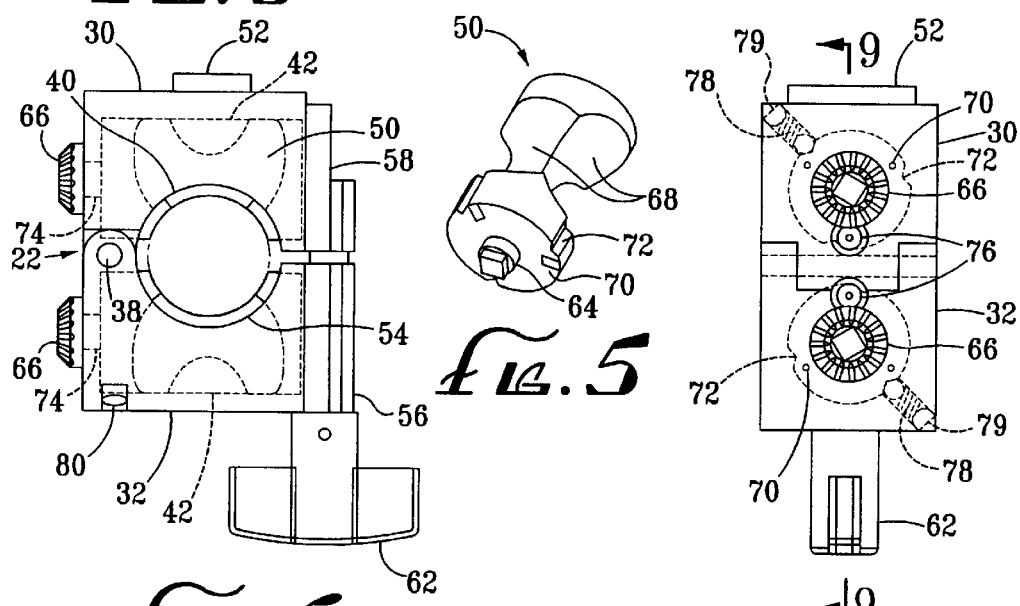

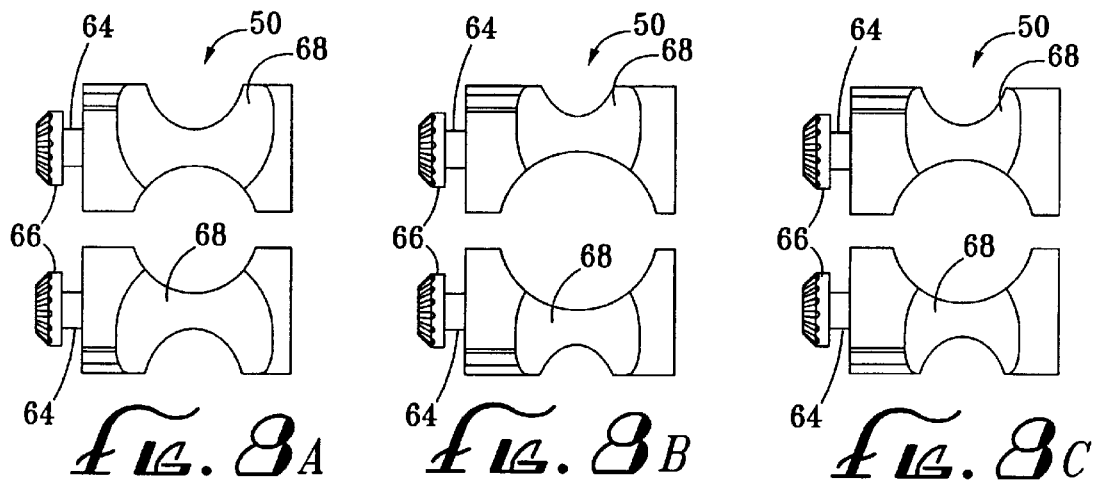
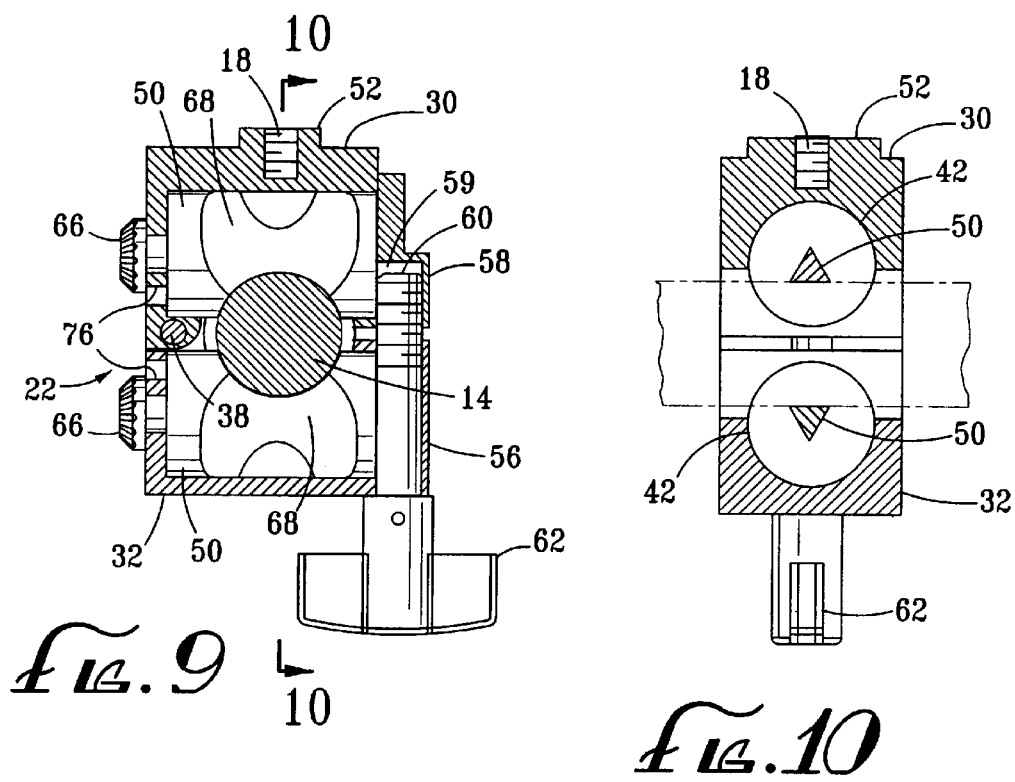

MULTI-JAW CLAMP

BACKGROUND OF THE INVENTION

The field of the present invention relates to a clamp for attaching a device to a cylindrical object. In particular, the invention relates to a clamp for attaching a filter and matte box assembly to the iris rods of a motion picture or video camera.

As set forth in U.S. Pat. No. 5,349,411, it is conventional for a filter and matte box assembly to be provided with a clamping mechanism built into the assembly. This clamping mechanism is sized to fit a specific size of iris rod, which projects from the front of the camera. The filter and matte box assemblies have been made to fit different sized iris rods so that when one assembly is used with a particular sized iris rod clamp and then a new camera is used having a different iris rod size, a new filter and matte box assembly was required because of the clamp no longer fitting the iris rod on the new camera. In the alternative, the clamp on the assembly may be replaceable, which requires a selection of clamps.

Since different camera manufacturers use different sized iris rods on their cameras, switching the entire filter and matte box assembly or the clamps to fit the different iris rods when changing cameras is an undesirable step. Also, this requires a camera rental company to maintain a large inventory of different sizes of clamps. Thus, it has been desirable to have a filter and matte box assembly that has a clamp that can fit varying sizes of iris rods to avoid having to replace the entire filter and matte box assembly. Having a clamp that can fit varying sizes of iris rods is also desirable because it is less expensive than having a number of filter and matte box assemblies or clamps. Therefore, a filter and matte box assembly that is capable of clamping to iris rods of several different sizes would be more economical and efficient and would reduce the number of matte box assemblies required.

SUMMARY OF THE INVENTION

The present invention provides an improved clamp for attaching objects to cylindrical objects of varying diameters. The multi-jaw clamp of the present invention includes two housings connected by a hinge for holding a pair of multi-jaw cylinders. The multi jaw cylinders contain at least two curved sections to attach around at least two different diameters of cylindrical objects, such as iris rods. The multi-jaw cylinders can be rotated to fit different diameters of cylindrical objects. The housing is locked into place around the cylindrical object by a locking mechanism attached at the free ends of the housings.

BRIEF DESCRIPTION OF THE DRAWINGS

FIG. 1 is a top plan view of the multi-jaw clamp according to the present invention and diagrammatically illustrating the camera with the iris rods and the matte box assembly;

FIG. 2 is a front elevation view of the multi-jaw clamp with the matte box assembly mounted on the clamp;

FIG. 3 is an isometric view of the back of the clamp with the clamp in the open position;

FIG. 4 is an isometric view of the front of the clamp with the clamp in the open position;

FIG. 5 is an isometric view of the multi-jaw cylinder;

FIG. 6 is a front elevation view of the clamp in the closed position;

FIG. 7 is a top plan view of the clamp in the closed position;

FIGS. 8A–8C are plan views of the multi-jaw cylinders juxtaposed in three different positions for fitting three different sizes of iris rods;

FIG. 9 is a cross-sectional view taken along the line 9—9 in FIG. 7 and showing the clamp in the closed position around a rod; and FIG. 10 is a cross-sectional view taken along the line 10—10 in FIG. 9 and showing the clamp in the closed position around a rod.

DETAILED DESCRIPTION OF THE PREFERRED EMBODIMENTS

The preferred embodiment of the present invention will now be described with reference to the drawings. To facilitate the description, a reference numeral representing an element in one figure will represent the same element in any other figure.

FIG. 1 is a top plan view of the multi-jaw clamp 10 according to a preferred embodiment mounted to a camera 12 on an iris rod 14 projecting forwardly of the camera 12 with a matte box assembly 16 attached to the clamp. Of course, a camera may be provided with two iris rods and such case there will be two clamps 10. The multi jaw clamp 10 includes a threaded hole 18 (best viewed in FIG. 9) for mounting the matte box assembly to the clamp so that the matte box is positioned in front of the camera lens 20. The multi-jaw clamp 10 includes a hinge assembly 22 that permits the clamp to open and close around the iris rod 14 as viewed in FIG. 2.

Details of the multi-jaw clamp are set forth in FIGS. 3–10. The clamp 10 is provided with two housings 30 and 32 that are connected by the hinge assembly 22, which allows the housings to open and close around the iris rod 14. The hinge assembly 22 includes the hinge section 34 of housing 30 and the hinge section 36 of housing 32, each of which hinge sections have holes through them to accommodate the hinge pin 38 extending the length of the hinge assembly 22. The ends of each of the hinge sections 34 and 36 are curved to accommodate the opening and closing of the clamp. Any mechanism similar to a hinge that will allow relative movement of housings 30 and 32 in the unlatched condition, as described below, but prevents separation in the latched condition may be used in place of hinge assembly 22.

The housing 30, as shown in FIG. 3, is generally rectangularly shaped and has a semi-circular channel 40 cut into the long side of the housing and runs the length of the short side of the housing. The housing 30 also contains a cylindrical hole 42 (best viewed in FIGS. 6 and 10) in the housing on the side opposite the hinge section 34 and cuts through the semi-circular channel 40. The cylindrical hole 42 does not penetrate through the side of the housing adjacent to the hinge section 34. The cylindrical hole 42 is sized to receive the multi-jaw cylinder 50 (best viewed in FIG. 10). The housing 30 also contains a rectangular shaped protrusion 52 on the side opposed to the semicircular channel 40 that contains a threaded hole 18 (shown in FIG. 9) for attaching a matte box assembly 16 or other items to the housing.

The housing 32 as shown in FIG. 3, is also generally rectangular in shape and has a semi-circular channel 54, similar to channel 40, cut into the long side of the housing, which hole runs the entire length of the short side of the housing. The housing 32 also contains a cylindrical hole 42 (the same as hole 42 in housing 30) in the housing on the side opposed to the hinge section 36 and cuts through the semi-circular channel 54. The cylindrical hole 42 does not penetrate through the side of the housing adjacent to the hinge section 36. The cylindrical hole 42 is sized to receive another multi-jaw cylinder 50 (best viewed in FIG. 10).

Referring now to FIG. 4, on the free ends of housings 30 and 32 cover plates 58 and 56, respectfully, are threadably connected to the housings. The plates cover cylindrical holes 42 in both housings. Cover plate 56 contains a hole that runs along the vertical length of the plate and opens toward housing 30. The hole is sized to receive a threaded bolt 60 so that the bolt can pass through the plate 56 and extend beyond the end of the plate. The side of the bolt opposed to housing 30 contains a handle 62 so that the bolt can be easily turned by hand. Cover plate 58 contains a threaded hole 59 that opens toward housing 32 and is sized and threaded to receive the end of bolt 60 that extends past cover plate 56. When bolt 60 is inserted into the hole in cover plate 58, the bolt can be turned using handle 62, which will close the free end of the clamp about a rod and secure it in place.

Referring now to FIG. 5, the multi-jaw cylinder will now be described. Each multi-jaw cylinder 50 is sized to fit within the cylindrical hole 42 in housings 30 and 32. The cylinder 50 contains a stem 64 protruding from one end to receive a selector 66 after the cylinder is placed in the housing. The stem 64 contains a square-shaped end for attaching the selector 66 to the stem. The cylinder, as shown in the preferred embodiment, has three curved sections 68 cut into the sides of the cylinder approximately 120° apart. The cylinder could be made with as few as two curved sections and could be made with more than three curved sections. Each curved section 68 on the cylinder has a different radius, so that when they are placed in the housing, they can be rotated into one of three positions to precisely fit one of three different diameters of rods. Aligned with the center of each of the curved sections is a size indicator 70 marked on the end of the cylinder containing the stem 64. Adjacent the size indicator is a v-shaped notch 72 that runs along the side of the cylinder from the end containing the stem to the curved section 68.

Referring now to FIG. 6, the clamp is shown in the closed position with the multi-jaw cylinders 50 inside the housings 30 and 32. The multi-jaw cylinders 50 are shown with the selectors 66 attached to the stem 64. Housings 30 and 32 contain holes 74 in the sides opposite the cover plates 56 and 58 sized to receive the stems 64 of the cylinders 50. The curved sections 68, in the preferred embodiment, will have diameters of approximately 0.591 in, 0.622 in. and 0.748 in to fit on conventional iris rods of those diameters. The diameters of the curved sections, however, can be of any size as needed to accommodate the size of the rods that the clamp will be attached to. The diameter of the semi-circular channels 40 and 54 will be larger than the largest diameter of the curved sections 68 on the multi-jaw cylinders 50 to insure that the curved sections 68 extend into the curved channels 40 and 54 for the multi-jaw cylinders to engage the iris rod 14 without the iris rod engaging the housings.

Referring now to FIG. 7, the top view of the clamp is shown. Adjacent to the hole 74 in each of the housings is a hole 76 so that the size indicator 70 is visible. As the selector 66 is turned, each of the three size indicators comes into view through the hole 76, which indicators may be numbers, letters or colors. Once the desired diameter is selected and the size indicator is viewable through hole 76, the multi-jaw cylinder is precisely located and inhibited from further rotation by a ball and spring detent mechanism 78 in which the ball engages the v-shaped notch 72 on the multi-jaw cylinder 50. The mechanisms 78 are located and retained by setscrews 79 in threaded holes 80, which are located in the housings 30 and 32. The hole 80 is located so that the ball of the mechanism 78 will engage the v-shaped notch 72 that is aligned with the curved section 68 that is adjacent to the curved section currently selected. As the setscrew 79 is rotated, it comes into contact with the spring for adjusting the resilient force applied to the ball and, in turn, on the v-shaped notch 72 on the cylinder and inhibits the cylinder from further rotation. As an alternative to the ball and spring detent mechanism, the setscrew, 79 may be longer and directly engage the cylinder 50, with or without a notch 72.

FIGS. 8A–8C diagrammatically indicate the various matching positions of the multi-jaw cylinders 50 apart from the housings 30 and 32. In FIG. 8A, the two cylinders 50 are in positions so that smallest radius curved sections 68 on the multi-jaw cylinders are aligned. In this position, the multi-jaw clamp would engage with the smallest diameter rod. In FIG. 8B, the two cylinders 50 are in positions so that the largest radius curved sections 68 are aligned. In this position, the multi-jaw clamp would engage with a rod with the largest diameter. In FIG. 8C, the two cylinders 50 are in positions so that the intermediate curved sections 68 are aligned. In this position, the multi-jaw clamp would engage with a rod with the intermediate sized diameter that the clamp could engage.

Referring to FIG. 9, a cross-section of the clamp in the closed position taken along line 9—9 in FIG. 7 is shown. In use, the multi-jaw clamp 10 is slid onto or hinged open and placed on the iris rod 14. The multi-jaw cylinders 50 are shown in each housing with an iris rod 14 engaged between the cylinders. Threaded bolt 60 is threadably engaged with the threaded hole 59 to lock the clamp in the closed position and tightly on the iris rod in the desired axial position. Also visible is the threaded hole 18 in the protrusion 52 on housing 30 that can be used to attach a matte box 16 or other items. FIG. 10 also shows a cross sectional view of the clamp taken along line 10—10 in FIG. 9. The cylindrical hole 42 to receive the multi-jaw cylinders 50 also are shown.

While embodiments and applications of this invention have been shown and described, it would be apparent to those skilled in the art that other modifications are possible without departing from the inventive concepts herein. The invention, therefore, is not to be restricted except in the spirit of the claims that follow.

What is claimed is:

1. A multi-jaw clamp for cylindrical rods of different diameters comprising:

a pair of housings with interconnecting means for allowing relative movement of said housings in a direction away from each other and clamping the housings toward each other;

a cylinder rotatably mounted in each housing on an axis of rotation substantially perpendicular to said relative movement direction, said axes of rotation of the two said cylinders being substantially parallel when the housings are clamped toward each other; and each said cylinder having at least two cylindrically curved surfaces formed in sides of and extending laterally across a cylindrical periphery of said cylinder with an axis of each cylindrically curved surface being in a plane perpendicular to said cylinder axis, said at least two cylindrically curved surfaces being at circumferentially spaced locations on said cylinder, and said at least two cylindrically curved surfaces being of different diameters that are substantially the different diameters of the cylindrical rods for fitting on the rods.

2. The multi-jaw clamp of claim 1, wherein said interconnecting means includes a hinge between said pair of housings along an edge of each housing.

3. The multi-jaw clamp of claim 2, wherein said interconnecting means includes a threaded bolt extending between the housings for clamping the housings toward each other.

4. The multi-jaw clamp of claim 1, further including indexing means in each housing engaging said cylinder for selectively locating said cylinder in a rotational direction for each cylindrical surface to face the other said cylinder.

5. The multi-jaw clamp of claim 4, wherein said indexing means comprises, a spring and ball detent mechanism, and said cylinder is provided with a groove engaged by said ball.

6. The multi-jaw clamp of claim 4, wherein said indexing means comprises a setscrew, and said cylinder is provided with a groove engaged by said setscrew.

7. The multi-jaw clamp of claim 1, wherein said housings and cylinders are provided with means for indicating which diameter of cylindrically curved surface on one said cylinder is facing the other said cylinder.

8. The multi-jaw clamp of claim 1, wherein each said cylinder is provided with three cylindrically curved surfaces of different diameters circumferentially spaced substantially 120° from each other.

9. A multi-jaw clamp comprising:
two cylinders containing at least two curved sections cut into the sides of the cylinders, a cylindrical stem extending from one end of each of the cylinders, and at least two v-shaped notches on the side of the cylinders oriented relative to said at least two curved sections;
two rectangular shaped housings containing semi-circular channels arranged to encircle a rod and each housing have a free end, a first hole in each of the housings through one end of the housings and cutting across the semi-circular channels to receive the cylinders, a second hole in each of the housings to receive the stem from the cylinders, the second hole located on the side opposed to the first hole, a threaded hole through the housing into the first hole, and each housing containing a hinge section with a hole therethrough;
at least one locator means in each housing and engageable with the v-shaped notch in the cylinders;
said rectangular shaped housings joined together by a hinge means opposite said free ends; and
said free ends being joined by means for adjusting the distance between the free ends so as to lock the clamp in position on the rod.

10. The multi-jaw clamp of claim 9, wherein said hinge means of said clamp comprises a hinge pin extending through the holes in each of the hinge sections of each housing and wherein said hinge pin is secured to the inside surface of the holes in only one of the hinge sections.

11. The multi-jaw clamp of claim 9, wherein said means for adjusting the distance between the free ends of the clamp comprises a threaded rod, a first cover plate threadably connected to one of the housings, the first cover plate containing a hole for the threaded rod to extend through, and a second cover plate threadably connected to one of the housings, the second cover plate containing a threaded hole to receive the threaded rod.

12. The multi-jaw clamp of claim 11, wherein the threaded rod has a handle attached to the side of the rod opposed to the threaded hole in the second cover plate.

13. The multi-jaw clamp of claim 9, wherein ends of the cylindrical stems on the cylinders are square-shaped.

14. The multi-jaw clamp of claim 13, wherein circular selector knobs containing a square-shaped hole are connected to the square-shaped end of the stems on the cylinders.

15. The multi-jaw clamp of claim 9, wherein the cylinders have a size indicator marked adjacent to the cylindrical stem corresponding to each curved section.

16. The multi-jaw clamp of claim 15, wherein the housings contain a hole adjacent the stem hole on each housing for viewing the size indicator mark on the cylinders.

17. The multi-jaw clamp of claim 9, wherein each said cylinder is provided with three cylindrical surfaces of different diameters circumferentially spaced substantially 120° from each other.

18. The multi-jaw clamp of claim 17, wherein the different diameters circumferentially spaced are 0.622 in., 0.748 in. and 0.591 in.

19. The multi-jaw clamp of claim 9, wherein said locator means engageable with the v-shaped notch comprise a spring and ball detent mechanism with the ball for engaging the v-shaped notch in the cylinder.

20. The multi-jaw clamp of claim 9, wherein said locator means engageable with the v-shaped notch comprise a set screw having a v-shaped end to engage with the v-shaped notch in the cylinder.

21. The multi-jaw clamp of claim 9, wherein one of the housings contains means for mounting objects to the clamp.

22. The multi-jaw clamp of claim 21, wherein the means for mounting objects to the clamp comprises a rectangular shaped protrusion with a threaded hole therethrough.

23. A multi-jaw clamp comprising:
a first cylinder containing a plurality of circular sections cut into the sides of the cylinder, a stem extending from the top of the cylinder, and v-shaped notches on the sides of the cylinder oriented relative to the circular sections;
a first rectangular shaped housing having a short side and a long side, said housing containing a semi-circular channel cut into the short side of the housing, a first hole through one end of the housing aligned with the long side of the rectangle, said first hole cutting across the semi-circular channel and sized to receive the first cylinder, a second hole in the housing opposed to the first hole and sized to receive the stem from the cylinder, a third hole through the housing and into the first hole, the third hole being a threaded hole, a hinge section on one end of the housing containing a fourth hole, and a rectangular protrusion extending from the side of the housing opposed to the semi-circular channel, the rectangular protrusion containing a threaded hole;
a second cylinder containing a plurality of circular sections cut into the sides of the cylinder, a stem extending from the top of the cylinder, and v-shaped notches on the sides of the cylinder oriented relative to the circular sections;
a second rectangular shaped housing having a short side and a long side, said second housing containing a semi-circular channel cut into the short side of the second housing, a first hole through one end of the second housing aligned with the long side of the rectangle, said first hole cutting across the semi-circular channel and sized to receive the second cylinder, a second hole in the second housing opposed to the first hole and sized to receive the stem from the second cylinder, a third hole through the second housing into the first hole, the third hole being a threaded hole, a hinge section on one side of the second housing containing a fourth hole;
locator means provided in said third holes in said first and second rectangular housings for engaging and retaining the position of the first and second cylinders;

said first and second rectangular housings joined together by hinge means on one side;

a first cover plate threadably connected to the side of the first housing containing the first hole, the first cover plate containing a threaded hole;

a second cover plate threadably connected to the side of the second housing containing the first hole, the second cover plate containing a through hole;

a threaded rod extending through the through hole in the second cover plate and threadably engageable with the threaded hole in the first cover plate.

24. The multi-jaw clamp of claim 23, wherein the threaded rod has a handle on the end opposed to the threaded hole in the first cover plate.

25. The multi-jaw clamp of claim 23, wherein the hinge means comprises a pin extending through the holes in the hinge sections in housings.

26. The multi-jaw clamp of claim 23, wherein the diameters of the semi-circular channels on each housing are larger than the largest diameter of the curved sections on the cylinders.

27. The multi-jaw clamp of claim 26, wherein the diameters of the semi-circular channels on each housing are approximately equal to the largest diameter of the curved sections on the cylinders.

* * * * *